US012732300B2

(12) United States Patent
Sagae et al.

(10) Patent No.: US 12,732,300 B2

(45) Date of Patent: Sep. 8, 2026

(54) TECHNIQUE TO REDUCE SIGNAL CROSSTALK BETWEEN CORES IN A MULTI-CORE OPTICAL FIBER TRANSMISSION

(71) Applicant: NTT, Inc., Tokyo (JP)

(72) Inventors: Yuto Sagae, Musashino (JP); Kazuhide Nakajima, Musashino (JP); Taiji Sakamoto, Musashino (JP); Takayoshi Mori, Musashino (JP); Takashi Matsui, Musashino (JP)

(73) Assignee: NTT, Inc., Tokyo (JP)

( * ) Notice: Subject to any disclaimer, the term of this patent is extended or adjusted under 35 U.S.C. 154(b) by 253 days.

(21) Appl. No.: 18/686,215

(22) PCT Filed: Aug. 27, 2021

(86) PCT No.: PCT/JP2021/031586

§ 371 (c)(1),
(2) Date: Feb. 23, 2024

(87) PCT Pub. No.: WO2023/026486

PCT Pub. Date: Mar. 2, 2023

(65) Prior Publication Data

US 2025/0192888 A1 Jun. 12, 2025

(51) Int. Cl.
*H04J 14/00* (2006.01)
*G02B 6/02* (2006.01)
(Continued)

(52) U.S. Cl.
CPC ........ *H04J 14/052* (2023.08); *G02B 6/02042* (2013.01); *H04B 10/2507* (2013.01); *H04B 10/2916* (2013.01)

(58) Field of Classification Search
CPC ............... H04J 14/052; G02B 6/02042; H04B 10/2507; H04B 10/2916
See application file for complete search history.

(56) References Cited

U.S. PATENT DOCUMENTS

| | | | | |
|---|---|---|---|---|
| 2013/0136404 A1* | 5/2013 | Feuer | .................... | H04J 14/052 385/124 |
| 2018/0259707 A1* | 9/2018 | Zalevsky | ........... | G02B 6/02042 |

OTHER PUBLICATIONS

P. J. Winzer et al., “Penalties from In-Band Crosstalk for Advanced Optical Modulation Formats,” in 37th European Conference and Exposition on Optical Communications, OSA Technical Digest (CD), Optica Publishing Group, 2011.

(Continued)

*Primary Examiner* — Casey L Kretzer

(74) *Attorney, Agent, or Firm* — Harness, Dickey & Pierce, PLC

(57) ABSTRACT

The present disclosure relates to an optical transmission system that transmits signal light by using a multi-core optical fiber having two or more cores as transmission paths, the optical transmission system including two or more transmitters that transmit signal light to adjacent cores, in opposite directions, of the cores, and two or more pump light oscillators that inject pump light into the same cores as transmission cores to which the signal light is transmitted of the adjacent cores such that the pump light propagates in the same directions as or directions reverse to the directions of the signal light, and perform distributed Raman amplification of the signal light by using the pump light, in which a signal light gain of the signal light transmitted from the transmitters is set such that a signal intensity ratio to a crosstalk noise intensity leaked from the adjacent transmission cores is high.

3 Claims, 19 Drawing Sheets

(51) Int. Cl.
*H04B 10/2507* (2013.01)
*H04B 10/291* (2013.01)

(56) References Cited

OTHER PUBLICATIONS

T. Matsui et al., "Step-index profile multi-core fibre with standard 125 μm cladding to full-band application," 45th European Conference on Optical Communication (ECOC 2019), 2019, pp. 1-4, doi: 10.1049/cp.2019.0751.

Yuto Sagae et al., "Ultra-Low Crosstalk Multi-Core Fiber with Standard 125-μm Cladding Diameter for 10,000km-Class Long-Haul Transmission," IEICE Transactions on Communications, vol. E103-B, No. 11, Nov. 2020, pp. 1199-1205.

S. Nozoe et al., "125 μm-cladding 2LP-mode and 4-core Multi-core Fibre with Air-hole Structure for Low Crosstalk in C+L Band," 2017 European Conference on Optical Communication (ECOC), 2017, pp. 1-3, doi: 10.1109/ECOC.2017.8346167.

A. Sano et al., "Crosstalk-Managed High Capacity Long Haul Multicore Fiber Transmission With Propagation-Direction Interleaving," in Journal of Lightwave Technology, vol. 32, No. 16, pp. 2771-2779, Aug. 15, 2014, doi: 10.1109/JLT.2014.2320826.

K. Kitamura et al., "Cross-talk characteristics of a hybrid multi-core fiber transmission system using distributed raman amplification," 2013 18th OptoElectronics and Communications Conference held jointly with 2013 International Conference on Photonics in Switching (OECC/PS), Jun. 30, 2013, pp. 1-2.

* cited by examiner

[2]

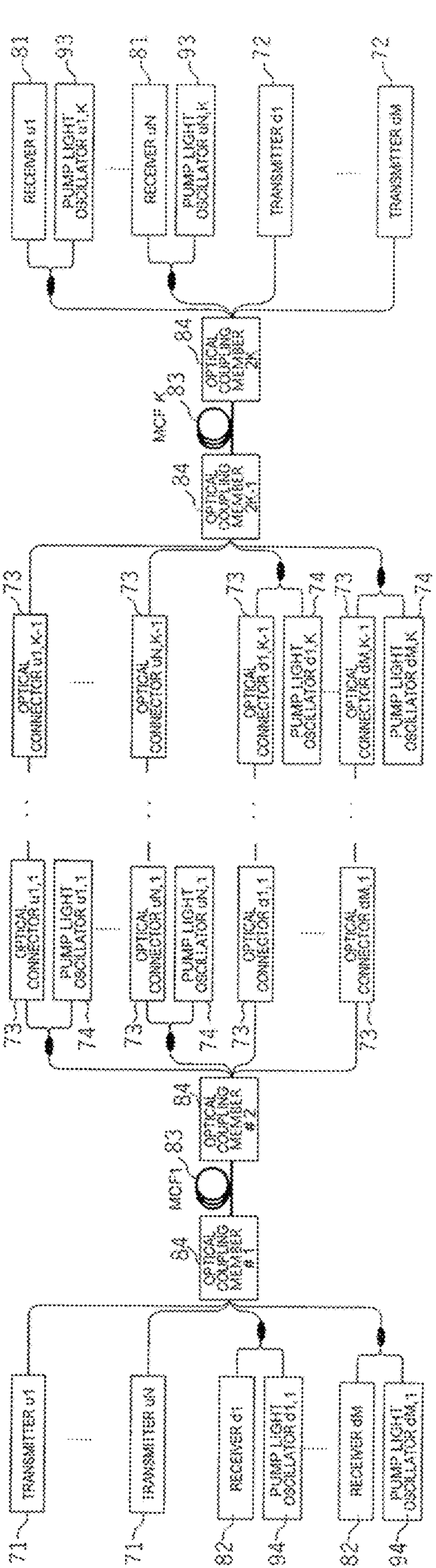
Fig. 3
[3]
TRANSMITTER u1
TRANSMITTER uN
RECEIVER d1
PUMP LIGHT OSCILLATOR d1,1
RECEIVER dM
PUMP LIGHT OSCILLATOR dM,1
OPTICAL COUPLING MEMBER #1
MCF1
OPTICAL COUPLING MEMBER #2
OPTICAL CONNECTOR u1,1
PUMP LIGHT OSCILLATOR u1,1
OPTICAL CONNECTOR uN,1
PUMP LIGHT OSCILLATOR uN,1
OPTICAL CONNECTOR d1,1
OPTICAL CONNECTOR dM,1
OPTICAL CONNECTOR u1,K-1
OPTICAL CONNECTOR uN,K-1
OPTICAL CONNECTOR d1,K-1
PUMP LIGHT OSCILLATOR d1,K
OPTICAL CONNECTOR dM,K-1
PUMP LIGHT OSCILLATOR dM,K
OPTICAL COUPLING MEMBER 2K-1
MCF K
OPTICAL COUPLING MEMBER 2K
RECEIVER u1
PUMP LIGHT OSCILLATOR u1,K
RECEIVER uN
PUMP LIGHT OSCILLATOR uN,K
TRANSMITTER d1
TRANSMITTER dM
71
82
94
84
83
73
74
81
93
72

TECHNIQUE TO REDUCE SIGNAL CROSSTALK BETWEEN CORES IN A MULTI-CORE OPTICAL FIBER TRANSMISSION

CROSS-REFERENCE TO RELATED APPLICATIONS

This application is a 371 U.S. National Phase of International Application No. PCT/JP2021/031586, filed on Aug. 27, 2021. The entire disclosure of the above application is incorporated herein by reference.

TECHNICAL FIELD

The present disclosure relates to an optical transmission system using a multi-core fiber as a transmission medium.

BACKGROUND ART

As a large-capacity transmission path technology, a space division multiplexing technology has attracted attention. In multi-core optical fiber transmission, which is one of the core technologies, signal crosstalk (hereinafter, referred to as XT) between cores is known as a limiting factor of transmission capacity increase (refer to, for example, Non Patent Literature 1).

Therefore, a method of designing an optical fiber for controlling signal crosstalk between cores has been proposed (refer to, for example, Non Patent Literatures 2 to 4). A bidirectional communication system in which a transmission is reoriented for each core has been proposed (refer to, for example, Non Patent Literature 5).

CITATION LIST

Non Patent Literature

Non Patent Literature 1: P. J. Winzer et al., ECOC Tu5.B.7 (2011)

Non Patent Literature 2: T. Matsui et al., ECOC M.1.D.5 (2019)

Non Patent Literature 3: Y. Sagae et al., IEICE Trans. Commun. E103-B.11 1199 (2020)

Non Patent Literature 4: S. Nozoe et al., ECOC (2017)

Non Patent Literature 5: A. Sano et al., JLT 32. 16. 2771 (2014)

SUMMARY OF INVENTION

Technical Problem

Further increase of the transmission capacity causes a problem of further reduction in XT combined with a fiber design or a transmission method.

An object of the present disclosure is to further reduce signal crosstalk between cores in multi-core optical fiber transmission.

Solution to Problem

The present disclosure proposes an optical transmission system to which distributed Raman amplification in an optical fiber is applied. As a result, the present disclosure controls an XT noise light intensity and realizes low XT.

Specifically, according to an optical transmission system and an optical transmission method of the present disclosure, the optical transmission system that transmits signal light by using a multi-core optical fiber having two or more cores as transmission paths, and includes two or more transmitters that transmit signal light to adjacent cores, in opposite directions, of the cores; and two or more pump light oscillators that inject pump light into the same cores as transmission cores to which the signal light is transmitted of the adjacent cores such that the pump light propagates in the same directions as or directions reverse to the directions of the signal light, and perform distributed Raman amplification of the signal light by using the pump light, in which a signal light gain of the signal light transmitted from the transmitters is set such that a signal intensity ratio to a crosstalk noise intensity leaked from the adjacent transmission cores is high.

Advantageous Effects of Invention

The present disclosure can further reduce signal crosstalk between cores in multi-core optical fiber transmission. Therefore, according to the present disclosure, an effect of increasing the transmission capacity of the optical transmission system is achievable.

BRIEF DESCRIPTION OF DRAWINGS

FIG. 3 is a multistage configuration diagram of bidirectional transmission and backward pumping DRA that realizes XT reduction.

DESCRIPTION OF EMBODIMENTS

Hereinafter, embodiments of the present disclosure will be described in detail with reference to the drawings. Note that the present disclosure is not limited to the embodiments described below. These embodiments are merely examples, and the present disclosure can be implemented in forms with various modifications and improvements on the basis of the knowledge of those skilled in the art. Constituents having the same reference signs in the present description and the drawings indicate the same constituents.

The present disclosure relates to an optical transmission system (using a multi-core optical fiber) using distributed Raman amplification characterized by the followings.

Signal light is transmitted to adjacent cores in opposite directions by transmitters.

Pump light is injected into the adjacent cores from a pump light oscillator to propagate in the same directions as or directions reverse to the directions of the signal light, and distributed Raman amplification of the signal light is realized.

A signal light gain of the signal light transmitted from the transmitters is designed such that a signal intensity ratio to a crosstalk noise intensity is high.

According to the present disclosure, it is practical to suppress the influence of crosstalk noise and increase the transmission capacity of the optical transmission system.

This will be described below in more detail.

Figure 1:
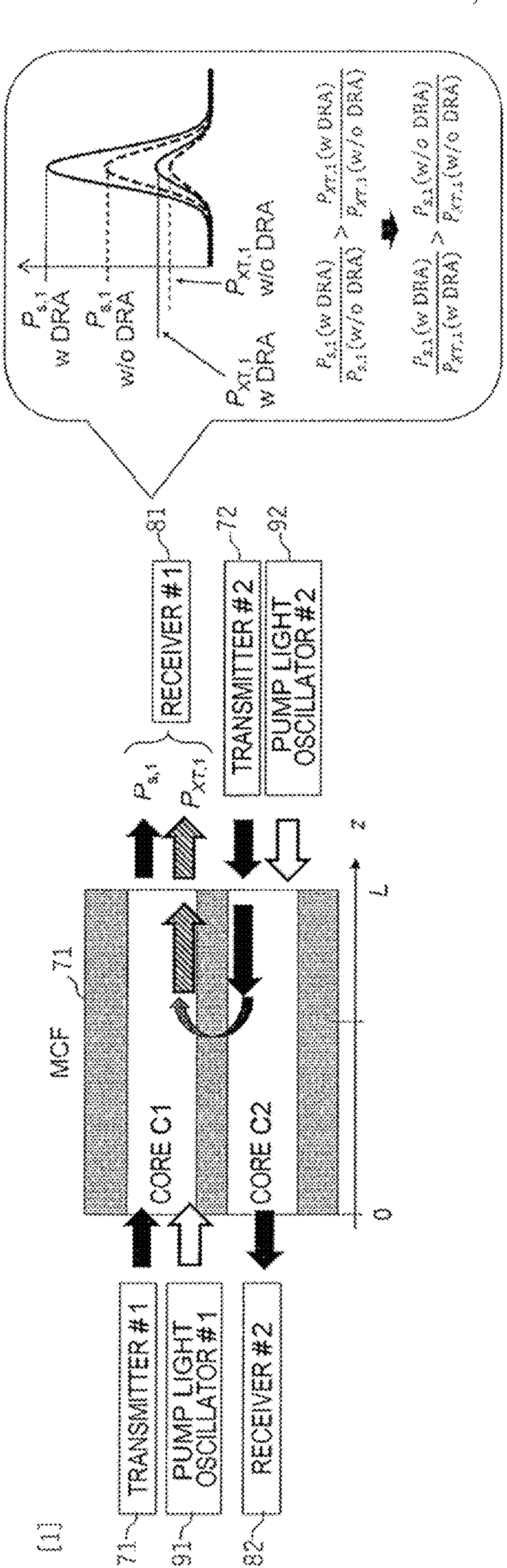
FIG. 1 schematically illustrates a transmission system for improving a signal-to-crosstalk noise intensity ratio by using distributed Raman amplification.

FIG. 1 is a conceptual diagram of an optical transmission system according to the present disclosure. Here, as an example, a system for performing forward pumping distributed Raman amplification (DRA) of signal light in a bidirectional transmission system in which propagation directions of signals are opposite to each other in response to cores C1 and C2, to which the number 1 and the number 2 are assigned respectively, adjacent to each other in an MCF transmission path will be described. One of the signals is transmitted from a transmitter 71 to the core C1, and the other is transmitted from a transmitter 72 to the core C2 to be opposite to the aforementioned signal. As described above, in the present disclosure, the signal light is transmitted in the opposite directions to different cores of the adjacent cores. The signal light in the core C1 is received by a receiver 81, and a received light intensity is $P_{s1}$. A portion of the signal light in the core C2 is coupled to the core C1, and crosstalk noise light (XT light) having a light intensity $P_{XT1}$ is detected in the receiver 81.

FIG. 1 illustrates an example in which a pump light oscillator 91 and a pump light oscillator 92 that realize DRA inject pump light in the same directions as those of the signal light in each core. The pump light oscillators 91 and 92 inject the pump light into the same cores as the transmission cores to which the signal light is transmitted of the adjacent cores C1 and C2. Thus, distributed Raman amplification of the signal light using the pump light is performed. Here, the pump light may be injected to propagate in the same directions as those of the signal light, or may be injected to propagate in directions reverse to those of the signal light. Although Psi and $P_{XT1}$ are amplified by the DRA, the amplification at Psi is larger than that at $P_{XT1}$, and as a result, an intensity ratio $P_{s1}/P_{XT1}$ of the signal light to XT light is improved.

Figure 2:
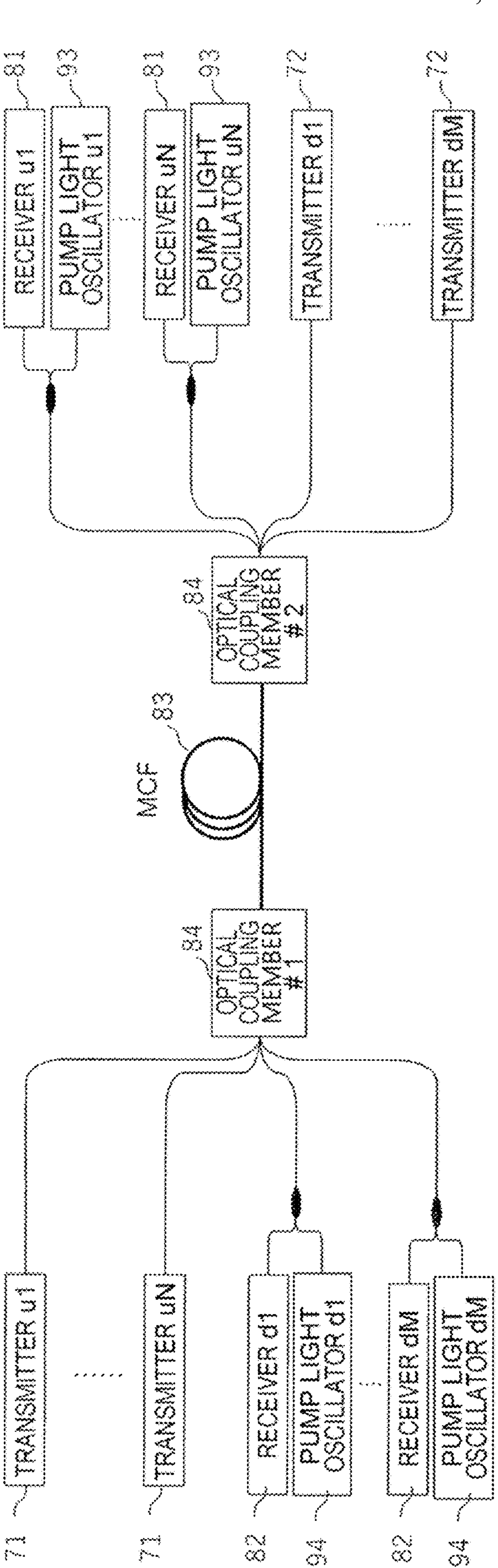
FIG. 2 is a configuration diagram of bidirectional transmission and backward pumping DRA that realizes XT reduction.

FIG. 2 is a configuration diagram of the optical transmission system according to the present disclosure where an MCF having (N+M) cores is used as a transmission path, as an example. Here, given that n is an integer from 1 to N, it is assumed that cores Cun, to which the number un is assigned each, are not adjacent to each other, and similarly, given that m is an integer from 1 to M, it is assumed that cores Cdm, to which the number dm is assigned each, are not adjacent to each other. Signals generated by transmitters **71*u*1 to 71*u*N are respectively transmitted to the cores Cu1 to CuN in an MCF 83 via an optical coupling member 84 #1, and are received by the receivers 81*u*1 to 81*u*N via an optical coupling member 84 #2. On the other hand, signals generated by the transmitters 72*d*1 to 72*d*M are respectively transmitted to the cores Cd1 to CdM in the MCF 83 via the optical coupling member 84 #2, and are received by the receivers 82*d*1 to 82*d*M via the optical coupling member 84** #1.

In this configuration, propagation directions of the signals propagating through the adjacent cores are opposite to each other. Pump light oscillators **93*u*1 to 93*u*N and pump light oscillators 94*d*1 to 94*d***M transmit pump light in the direction reverse to the signal propagation direction in each core. That is, the signal light propagating through the cores Cu1 to CuN and the cores Cd1 to CdM is amplified by the backward pumping DRA.

Regarding the optical transmission system according to the present disclosure, FIG. 3 is a configuration diagram of the transmission systems, connected in K stages, each illustrated in FIG. 2 in which an MCF having (N+M) cores is used as a transmission path, as an example here. K is an integer of 2 or more. Given that n and m are integers of 1 to N and 1 to M, the stages are connected via optical connectors **73*un*,1 to 73*un*, K−1 and optical connectors 73*dm*, 1 to 73*dm*, K−1 each. In each stage, backward pumping DRA of signal light is realized by pump light emitted from the pump light oscillators 74*dn*,1 to 74*dn*,K and 74*dm*,1 to 74*dm***,K. This configuration is preferable because a planar network is constructable by disposing a router or the like in a connection portion in each stage.

Figure 4:
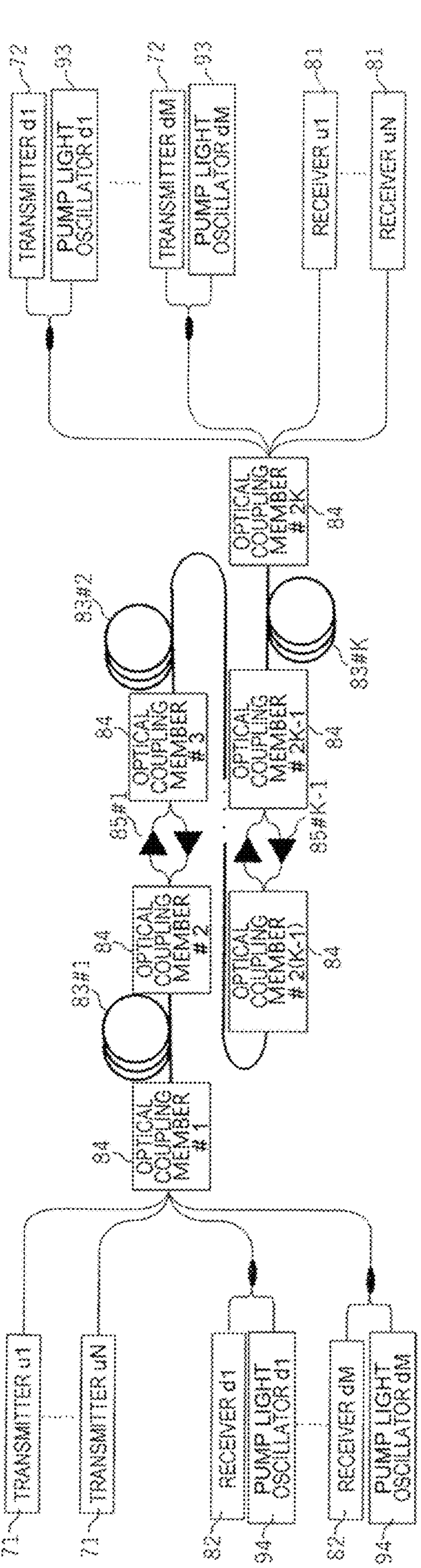
FIG. 4 is a relay configuration diagram of bidirectional transmission and backward pumping DRA that realizes XT reduction.

FIG. 4 illustrates an optical transmission system in which K MCFs 83 are connected via K−1 amplification members 85 in the optical transmission system according to the present disclosure. The transmitters 71 and 72, the receivers 81 and 82, and the pump light oscillators 93 and 94 have the configurations illustrated in FIG. 2, and perform the backward pumping DRA of the signal light in the MCFs 83 #1 to 83 #K. Given that k is an integer of 1 to K−1, the MCF 83 #k is connected to the amplification member 85 #k via the optical coupling member 84 #2k and the optical coupling member 84 #2k+1. In this configuration, since a loss caused by the signal light propagating through the MCF is compensated by the amplification member 85, it is practical to cope with a long-distance transmission path, which is preferable.

Figure 5:
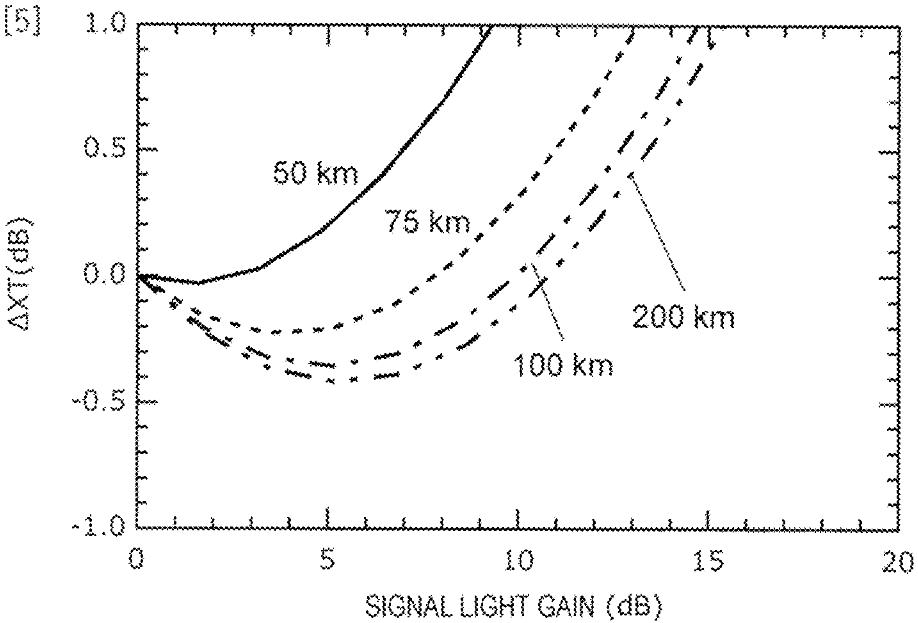
FIG. 5 is an example of signal light gain dependency of XT change in bidirectional transmission and backward pumping.

FIG. 5 illustrates a signal light gain dependency of an XT change ΔXT in the configuration illustrated in FIG. 2 in the optical transmission system according to the present disclosure. The XT change is obtained by ΔXT=XT1−XT, where XT with the DRA unapplied is XT0 (dB), and XT with the DRA applied is XT1 (dB). Here, a two-core transmission path is assumed as an example. When the same signal light gain is realized in each core, ΔXT characteristics at transmission distances of 50, 75, 100, and 200 km are respectively indicated by a solid line, a dashed line, a one-dot chain line, and a two-dot chain line. ΔXT is varied by the signal light gain of the backward pumping DRA, and XT reduction is realized in the region of ΔXT<0. These characteristics can also be realized with the device configurations of FIGS. 3 and 4.

Figure 6:
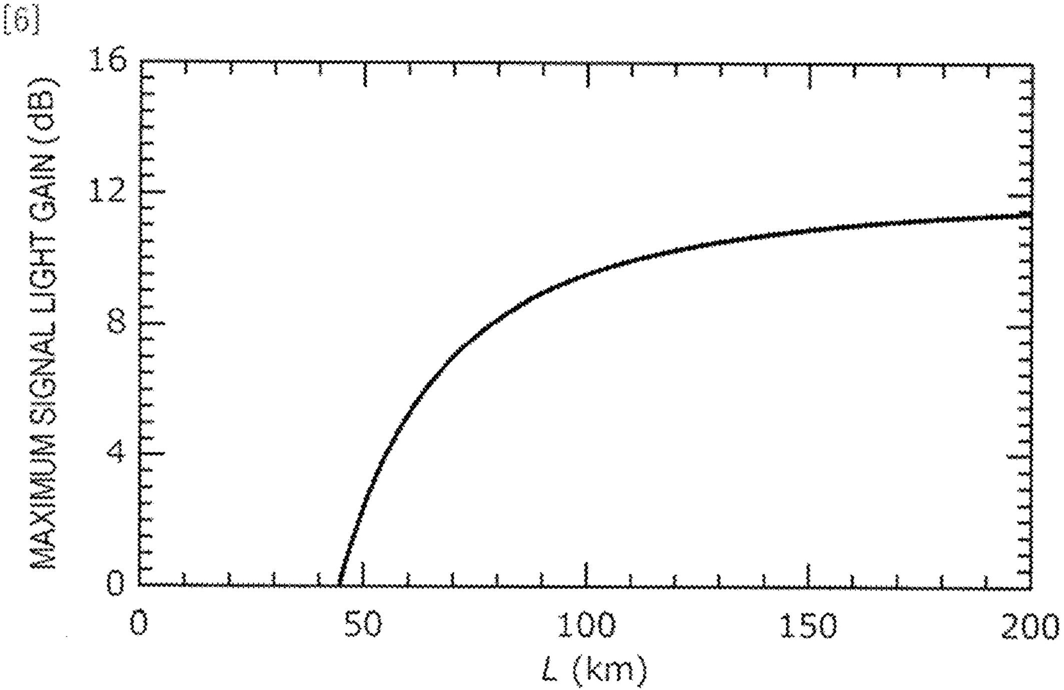
FIG. 6 is an example of transmission distance dependency of a maximum signal light gain that realizes XT reduction in backward pumping.

FIG. 6 illustrates a transmission distance dependency of a maximum signal light gain $G_{max}$ that realizes XT reduction in the configuration illustrated in FIG. 2, that is, realizes ΔXT≤0 in FIG. 3 in the optical transmission system according to the present disclosure. Given that a transmission distance is L, the solid line in the drawing can be expressed by Formula (1).

(Math. 1)

$$G_{max} = 12.1 - 18.1 \times 10^3 L^{-1.9} \quad (1)$$

As described above, in the configuration illustrated in FIG. 2, the signal light gain $G_s$ is set to $$G_s \leq 12.1 - 18.1 \times 10^3 L^{-1.9},$$

and thus XT can be reduced.

Figure 7:
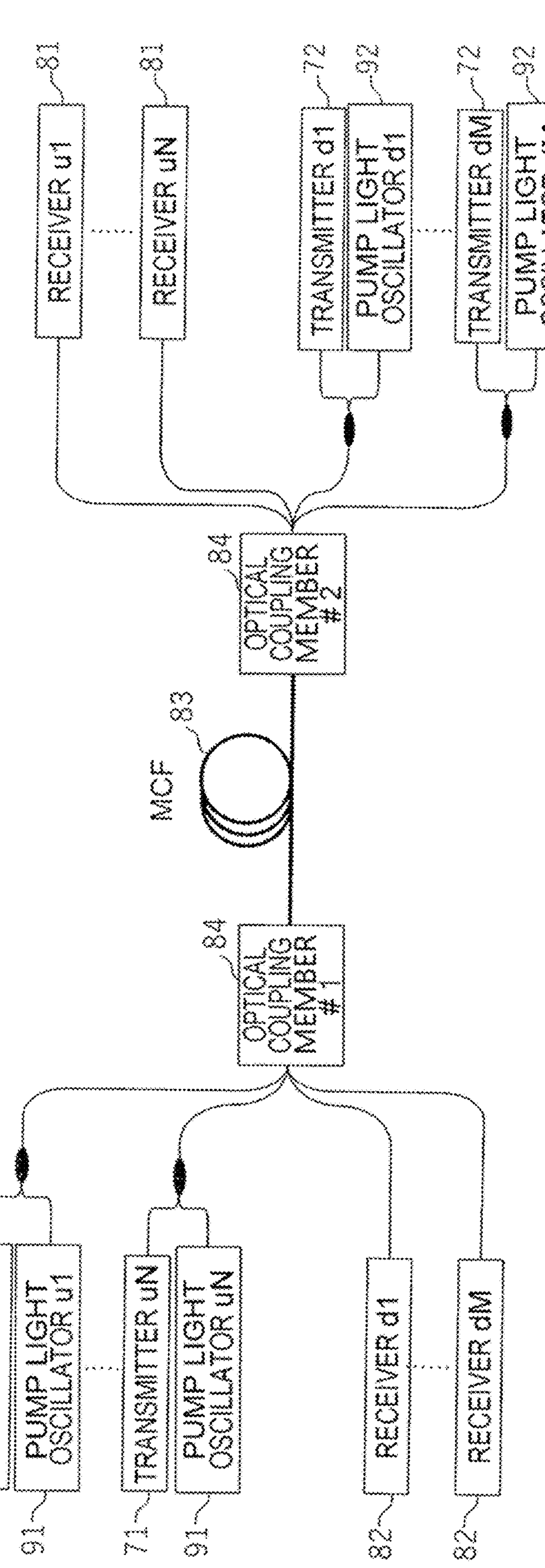
FIG. 7 is a configuration diagram of bidirectional transmission and forward pumping DRA that realizes XT reduction.

FIG. 7 is a configuration diagram of the optical transmission system according to the present disclosure where an MCF having (N+M) cores is used as a transmission path as an example. Here, given that n is an integer from 1 to N, it is assumed that cores Cun, to which the number un is assigned each, are not adjacent to each other, and similarly, given that m is an integer from 1 to M, it is assumed that cores Cdm, to which the number dm is assigned each, are not adjacent to each other. Signals generated by the transmitters 71*u*1 to 71*u*N are respectively transmitted to the cores Cu1 to CuN in the MCF via the optical coupling member 84 #1, and are received by the receivers 81*u*1 to 81*u*N via the optical coupling member 84 #2. On the other hand, signals generated by the transmitters 72*d*1 to 72*d*M are respectively transmitted to the cores d1 to dM in the MCF via the optical coupling member 84 #2, and are received by the receivers 82*d*1 to 82*d*M via the optical coupling member 84 #1.

In this configuration, propagation directions of the signals propagating through the adjacent cores are opposite to each other. The pump light oscillator 91*u*1 to 91*u*N and the pump light oscillator 92*d*1 to 92*d*M transmit pump light in the same direction as the signal propagation direction in each core. That is, the signal light propagating through the cores Cu1 to CuN and the cores Cd1 to CdM is amplified by the forward pumping DRA. Each of the pump light oscillators 91 and 92 independently determines a pump light intensity and controls an amplification gain of the signal light such that the signal light propagating through each core reaches the receiver with a desired intensity.

Figure 8:
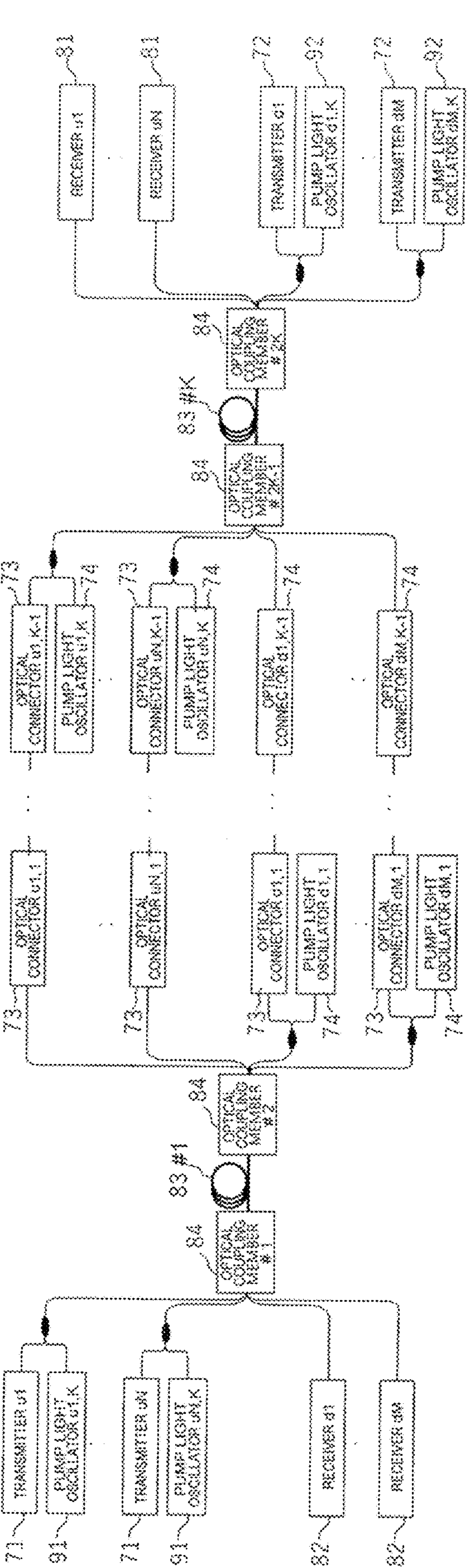
FIG. 8 is a multistage configuration diagram of bidirectional transmission and backward pumping DRA that realizes XT reduction.

Regarding the optical transmission system according to the present disclosure, FIG. 8 is a configuration diagram of the transmission systems, connected in K stages, each illustrated in FIG. 7 in which an MCF having (N+M) cores is used as a transmission path, as an example here. K is an integer of 2 or more. Given that n and m are integers of 1 to N and 1 to M, the stages are connected via optical connectors 73*un*, 1 to 73*un*, K−1 and optical connectors 73*dm*, 1 to 73*dm*, K−1 each. In each stage, the signal light propagating through each core is amplified by the forward pumping DRA using the pump light from the pump light oscillators 74*dn*, 1 to 74*dn*, K and 74*dm*, 1 to 74*dm*,K. This configuration is preferable because a planar network is constructable by disposing a router or the like in a connection portion in each stage.

Figure 9:
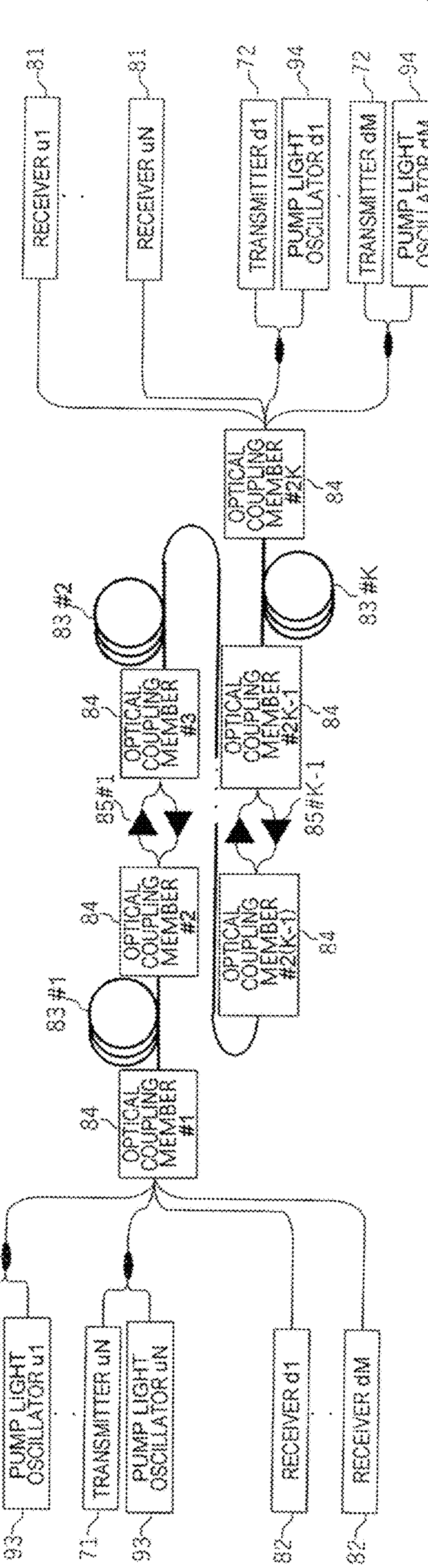
FIG. 9 is a configuration diagram of bidirectional transmission and forward pumping DRA that realizes XT reduction.

FIG. 9 illustrates an optical transmission system in which K MCFs 83 are connected via K−1 amplification members 85 in the optical transmission system according to the present disclosure. The transmitters 71 and 72, the receivers 81 and 82, and the pump light oscillators 91 and 92 have the configurations illustrated in FIG. 7, and perform forward pumping DRA of the signal light in the MCFs 83 #1 to 83 #K. Given that k is an integer of 1 to K−1, the MCF—83 #k and the MCF—83 #k+1 are connected via the optical coupling member 84 #2k, the optical coupling member 84 #2k+1, and the amplification member 85 #k. In this configuration, since a loss caused by the signal light propagating through the MCF is compensated by the amplification member 85, it is possible to cope with a long-distance transmission path, which is preferable.

Figure 10:
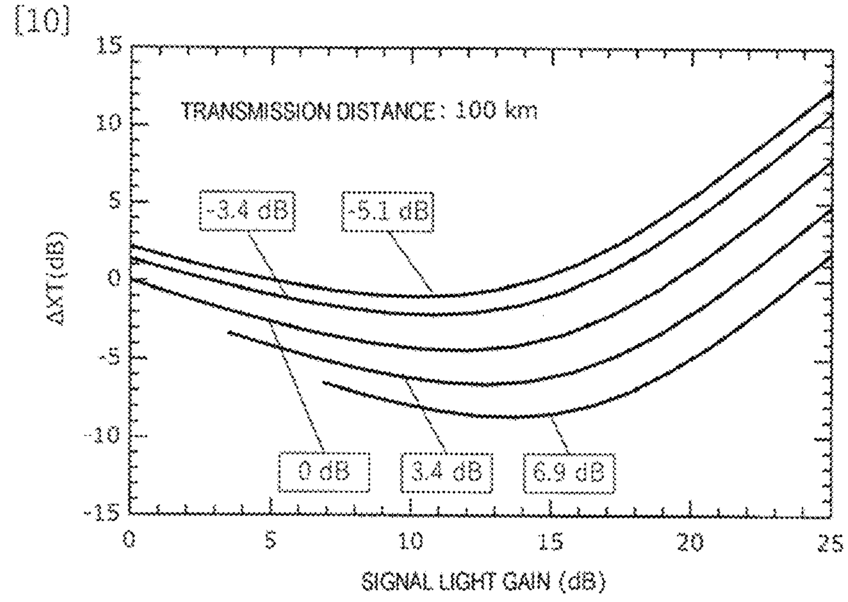
FIG. 10 illustrates an example of a dependency (transmission distance: 100 km) of an XT reduction amount on a signal light gain.

FIG. 10 illustrates a dependency of ΔXT on a signal light gain at a transmission distance of 100 km according to the present disclosure. The individual solid lines indicate results where the difference ΔG of the signal light gain $G_1$ in the transmission cores to the signal light gain $G_2$ in the adjacent cores is set to −5.1 dB, −3.4 dB, 0 dB, 3.4 dB, and 6.9 dB. When the signal light gain $G_1$ in the transmission cores is larger than the signal light gain $G_2$ in the adjacent cores, i.e., provided ΔG>0, there is a maximum signal light gain that reduces XT, that is, satisfies ΔXT≤0. On the other hand, when the signal light gain $G_1$ in the transmission cores is smaller than the signal light gain $G_2$ in the adjacent cores, i.e., provided ΔG<0, there are a minimum value and a maximum value of the signal light gain that satisfy ΔXT≤0.

Figure 11:
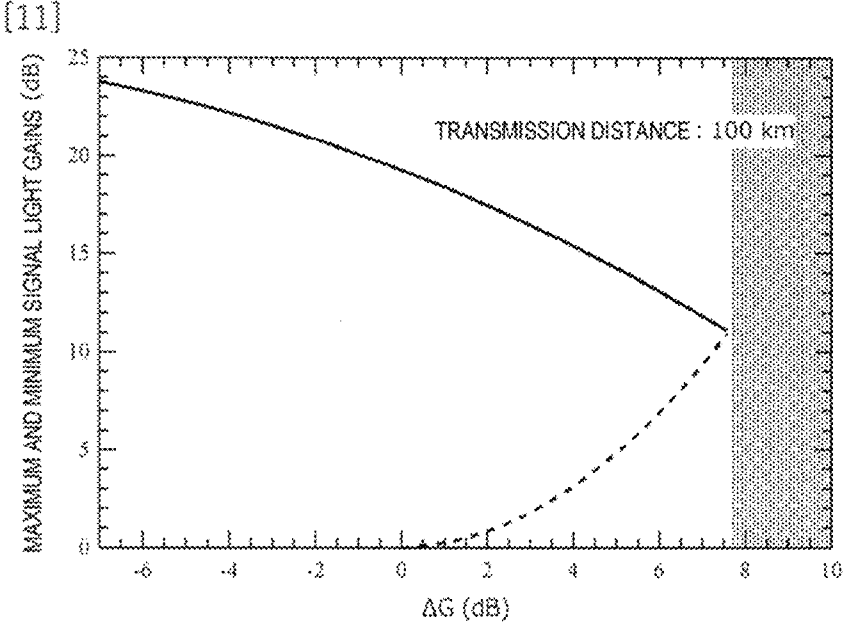
FIG. 11 illustrates an example of a gain difference dependency (transmission distance: 100 km) of maximum and minimum signal light gains that realize XT reduction.

FIG. 11 illustrates a ΔG dependency of the maximum and minimum signal light gains $G_1$ that realize XT reduction. The solid line represents a maximum signal light gain $G_{max}$, and the dashed line represents a minimum signal light gain $G_{min}$. On condition of ΔG>7.6 dB or more (gray), the XT reduction effect cannot be achieved. When the signal light gain is smaller than the solid line in the drawing and larger than the dashed line, XT reduction is realized. Here, the solid line may be expressed by Formula (2), and the dashed line may be expressed by Formula (3).

$$G_{max} = 19.4 - 0.9\Delta G + 0.03\Delta G^2 \quad (2)$$

$$G_{min} = 0.04\Delta G + 0.2\Delta G^2 \quad (3)$$

Therefore, XT reduction can be realized by setting the following equations at the transmission distance of 100 km:

$$0 \leq G_1 \leq 19.35 - 0.85\Delta G + 0.03\Delta G^2 \text{ at } \Delta G < 7.6 \text{ dB, and}$$

$$0.04\Delta G + 0.2\Delta G^2 \leq G_1 \leq 19.4 - 0.9\Delta G + 0.03\Delta G^2 \text{ at } 0 \leq \Delta G < 7.6.$$

Figure 12:
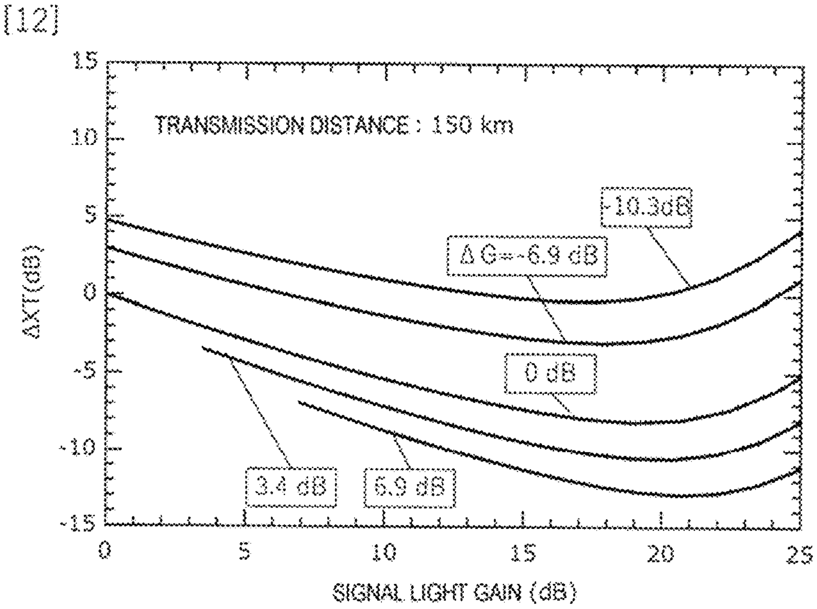
FIG. 12 illustrates an example of a dependency of an XT reduction amount (transmission distance: 150 km) on a signal light gain where there is a signal light gain difference between cores.

FIG. 12 illustrates a dependency of ΔXT on a signal light gain at a transmission distance of 150 km according to the present disclosure. The individual solid lines indicate results where the difference ΔG of the signal light gain $G_1$ in the transmission cores to the signal light gain $G_2$ in the adjacent cores is set to −10.3 dB, −6.9 dB, 0 dB, 3.4 dB, and 6.9 dB. When the signal light gain $G_1$ in the transmission cores is larger than the signal light gain $G_2$ in the adjacent cores, i.e., provided ΔG>0, there is a maximum signal light gain that realizes XT reduction, that is, satisfies ΔXT≤0. On the other hand, when the signal light gain $G_1$ in the transmission cores is smaller than the signal light gain $G_2$ in the adjacent cores, i.e., provided ΔG<0, there are a minimum value and a maximum value of the signal light gain that satisfy ΔXT≤0.

Figure 13:
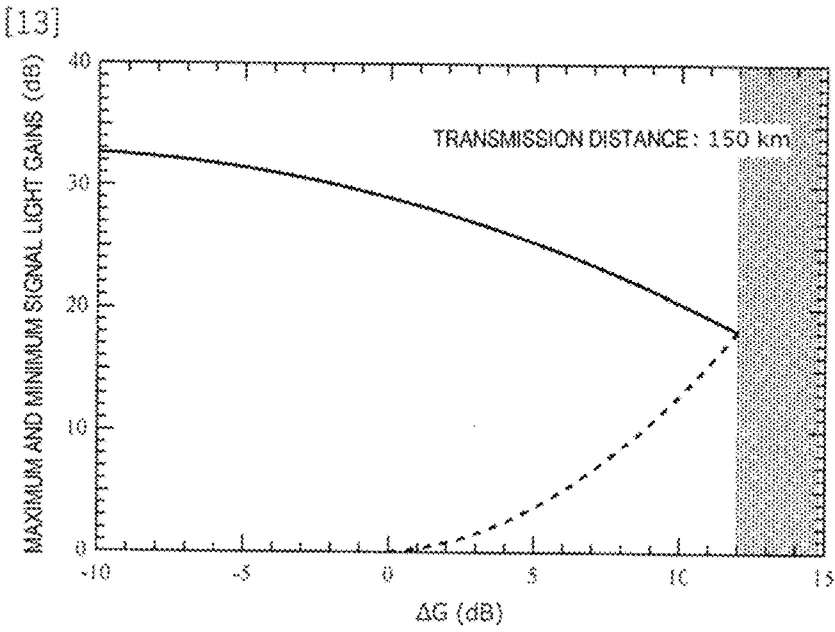
FIG. 13 illustrates an example of a gain difference dependency (transmission distance: 150 km) of maximum and minimum signal light gains that realize XT reduction.

FIG. 13 illustrates a ΔG dependency of the maximum and minimum signal light gains $G_1$ that realize XT reduction. The solid line represents a maximum signal light gain $G_{max}$, and the dashed line represents a minimum signal light gain $G_{min}$. On condition of ΔG>12.0 dB or more (gray), the XT reduction effect cannot be achieved. When the signal light gain is smaller than the solid line in the drawing and larger than the dashed line, XT reduction is realized. Here, the solid line may be expressed by Formula (4), and the dashed line may be expressed by Formula (5).

$$G_{max} = 29.0 - 0.6\Delta G + 0.02\Delta G^2 \tag{4}$$

$$G_{min} = 0.2\Delta G + 0.1\Delta G^2 \tag{5}$$

Therefore, XT reduction can be realized by setting the following equations at the transmission distance of 150 km:

$$0 \le G_1 \le 29.01 - 0.61\Delta G + 0.02\Delta G^2 \text{ at } \Delta G < 12.0 \text{ dB,}$$

and $$0.19\Delta G + 0.11\Delta G^2 \le G_1 \le 29.01 - 0.61\Delta G + 0.02\Delta G^2 \text{ at } 0 \le \Delta G < 12.0.$$

Here, in Formulas (2) and (4) and Formulas (3) and (5), given that coefficients K1(L), K2(L), K3(L), K4(L), and K5(L) depending on the transmission distance L are used, $G_{max}$ and $G_{min}$ are expressed by the following formulas, respectively.

$$G_{max} = K1(L) + K2(L)\Delta G + K3(L)\Delta G^2$$

$$G_{min} = K4(L)\Delta G + K5(L)\Delta G^2$$

Figure 14:
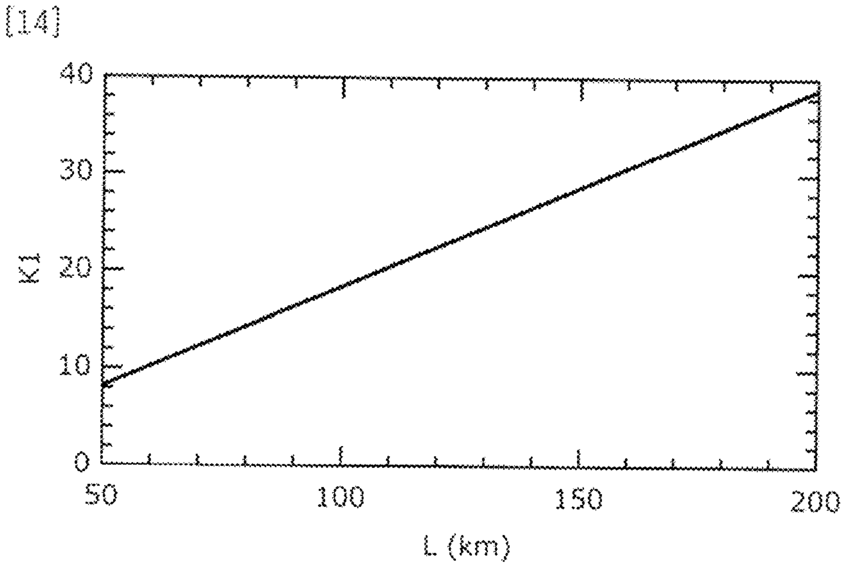
FIG. 14 illustrates an example of a transmission distance dependency of K1.

FIG. 14 illustrates an L dependency of K1. The solid line in the drawing may be expressed by Formula (6).

(Math. 6)

$$K1 = -2.0 + 0.2L \tag{6}$$

Figure 15:
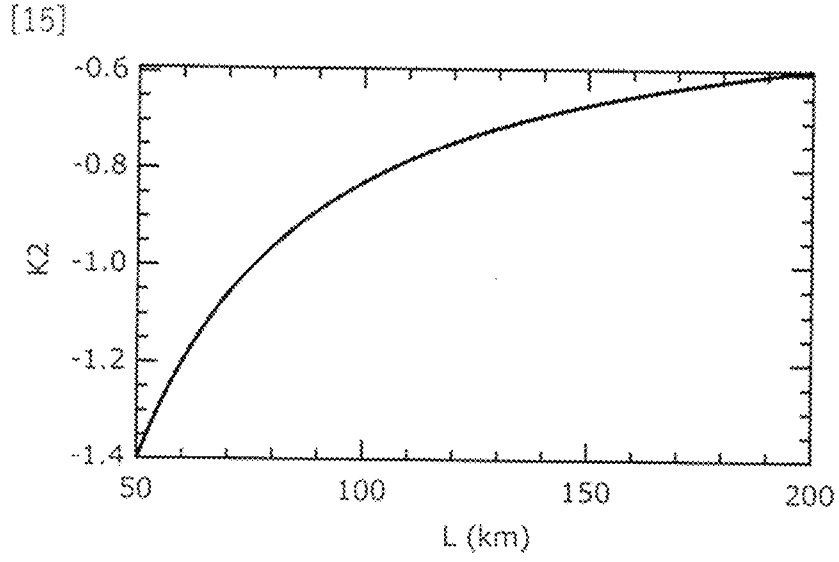
FIG. 15 illustrates an example of a transmission distance dependency of K2.

FIG. 15 illustrates an L dependency of K2. The solid line in the drawing may be expressed by Formula (7).

(Math. 7)

$$K2 = -0.4 - 140.5L^{-1.3} \tag{7}$$

Figure 16:
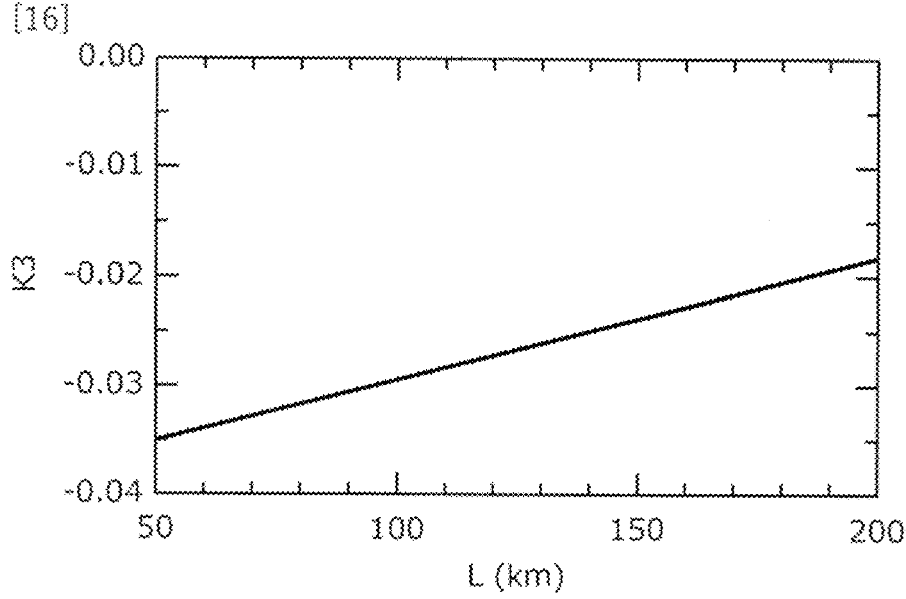
FIG. 16 illustrates an example of a transmission distance dependency of K3.

FIG. 16 illustrates an L dependency of K2. The solid line in the drawing may be expressed by Formula (8).

(Math. 8)

$$K3 = -0.04 + 1.1 \times 10^{-4}L \tag{8}$$

As described above, a maximum signal light gain that realizes the XT reduction may be expressed by the following Formula using ΔG and L.

(Math. 9)

$$G_{max} = -2.0 + 0.2L + (-0.4 - 140.5L^{-1.3})\Delta G + (-0.04 + 1.1 \times 10^{-4})\Delta G^2 \tag{9}$$

Figure 17:
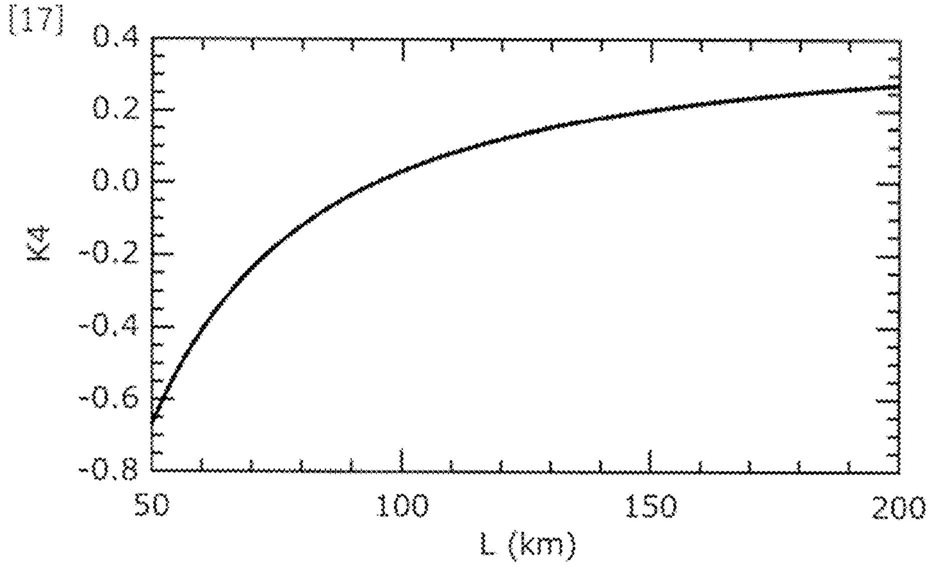
FIG. 17 illustrates an example of a transmission distance dependency of K4.

FIG. 17 illustrates an L dependency of K4. The solid line in the drawing may be expressed by Formula (10).

(Math. 10)

$$K4 = -0.40 - 443.8L^{-1.5} \tag{10}$$

Figure 18:
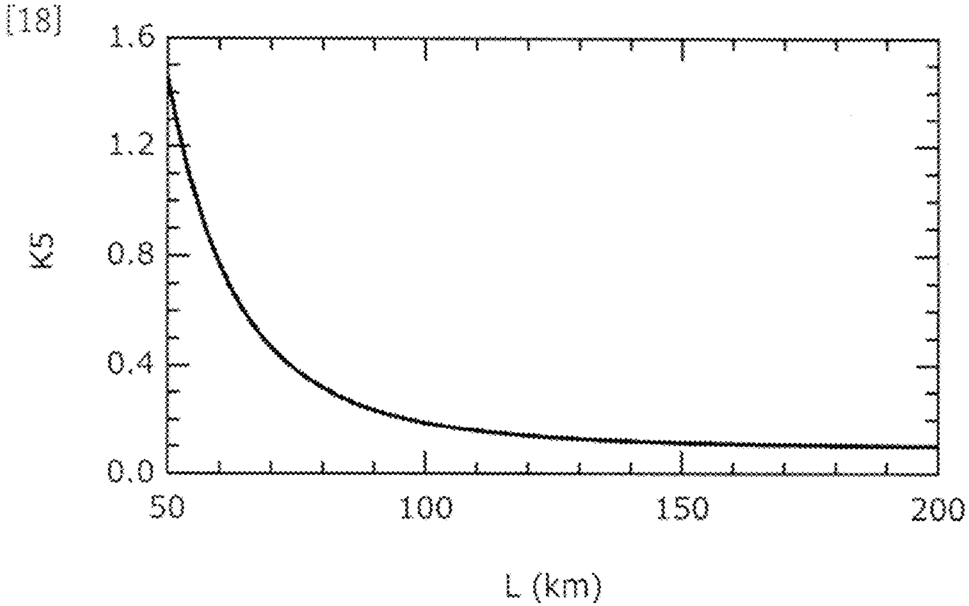
FIG. 18 illustrates an example of a transmission distance dependency of K5.

FIG. 18 illustrates an L dependency of K5. The solid line in the drawing may be expressed by Formula (11).

(Math. 11)

$$K5 = -0.1 - 8.0 \times 10^6 L^{-4} \tag{11}$$

As described above, the minimum signal light gain that realizes the XT reduction may be expressed by the following Formula using ΔG and L.

$$G_{min} = (-0.40 - 443.8L^{-1.5})\Delta G + (-0.10 - 8.0 \times 10^6 L^{-4})\Delta G^2$$

Therefore, the XT reduction effect can be achieved by setting the signal light gain $G_1$ as follows with respect to ΔG and L:

$$G_1 \le -2.0 + 0.2L + (-0.4 - 140.5L^{-1.3})\Delta G + (-0.04 + 1.1 \times 10^{-4})\Delta G^2$$

and $$(-0.4 - 443.8L^{-1.5})\Delta G + (-0.1 - 8.0 \times 10^6 L^{-4})\Delta G^2 \le G_1 \text{ provided } 0 \le \Delta G.$$

Figure 19:
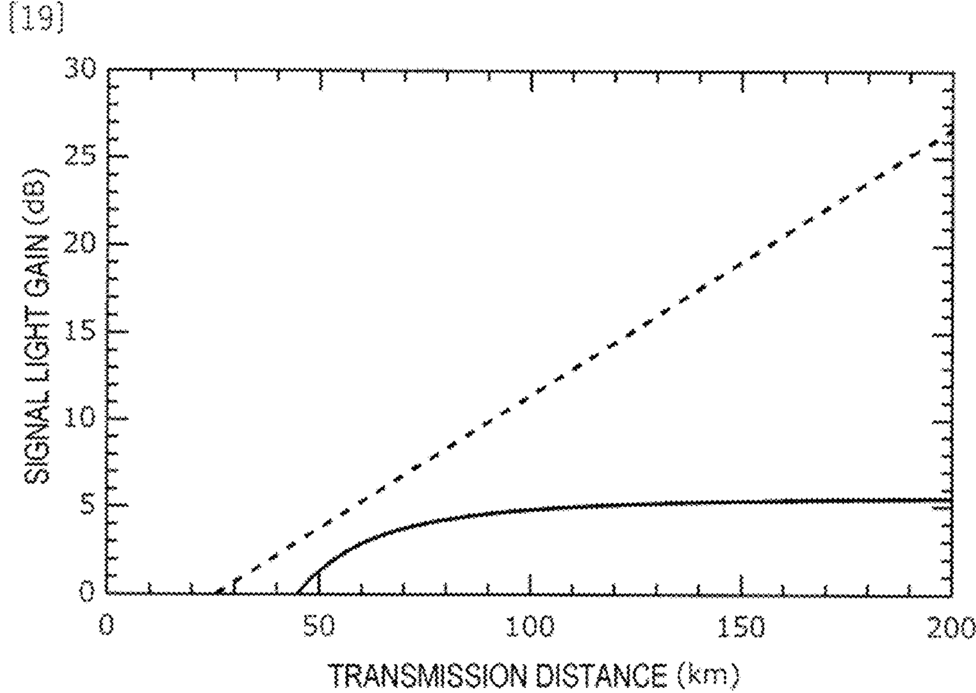
FIG. 19 illustrates an example of a transmission distance dependency of a signal light gain for minimizing XT in backward pumping and forward pumping DRA.

FIG. 19 illustrates a transmission distance dependency of the signal light gain $G_s$ that minimizes ΔXT in the configuration in which the backward pumping and the forward pumping DRAs illustrated in FIGS. 2 and 7 are performed in the optical transmission system according to the present disclosure. Here, a two-core transmission path is assumed as an example, and it is assumed that the same signal light gain is realized in each core. The solid line and the dashed line in the drawing indicate the examples of the backward pumping DRA and the forward pumping DRA, and, given that the transmission distance is L, each curve can be expressed by the following formulas (12) and (13).

(Math. 12)

$$G_s = 5.6 - 6.2\times10^4 L^{-2.4} \quad (12)$$

(Math. 13)

$$G_s = 3.9 - 0.2L \quad (13)$$

The maximum XT reduction effect can be achieved by designing the transmission system enabling the signal light gain expressed by Formulas (12) and (13) to be realized.

INDUSTRIAL APPLICABILITY

The present disclosure can be applied to the information and communications industry.

REFERENCE SIGNS LIST

73 Optical connector
74 Pump light oscillator
83 MCF
84 Optical coupling member
85 Optical amplifier
71, 72 Transmitter
81, 82 Receiver
91, 92, 93, 94 Pump light oscillator

The invention claimed is:

1. An optical transmission system that transmits signal light by using a multi-core optical fiber having two or more cores as transmission paths, the optical transmission system comprising:

two or more transmitters that transmit signal light to adjacent cores, in opposite directions; and two or more pump light oscillators that inject pump light into the same cores as transmission cores to which the signal light is transmitted of the adjacent cores such that the pump light propagates in the same directions as or directions reverse to the directions of the signal light, and perform distributed Raman amplification of the signal light by using the pump light, wherein a signal light gain of the signal light transmitted from the transmitters is set such that a ratio of signal intensity to a crosstalk noise intensity leaked from the adjacent transmission cores is maximized, wherein a signal light gain $G_s$ of the signal light satisfies the following formula with respect to a transmission distance L of the adjacent transmission cores:

$$G_s \leq 12.1 - 18.1\times10^3 L^{-1.9}.$$

2. An optical transmission system that transmits signal light by using a multi-core optical fiber having two or more cores as transmission paths, the optical transmission system comprising:

two or more transmitters that transmit signal light to adjacent cores, in opposite directions; and two or more pump light oscillators that inject pump light into the same cores as transmission cores to which the signal light is transmitted of the adjacent cores such that the pump light propagates in the same directions as or directions reverse to the directions of the signal light, and perform distributed Raman amplification of the signal light by using the pump light, wherein a signal light gain of the signal light transmitted from the transmitters is set such that a ratio of signal intensity to a crosstalk noise intensity leaked from the adjacent transmission cores is maximized, wherein signal light gains of the signal light in the adjacent transmission cores are $G_1$ and $G_2$, and the signal light gain $G_1$ satisfies the following formula with respect to a signal light gain difference ΔG, which is a difference of $G_1$ to $G_2$, and the transmission distance L:

$$G_1 \leq -2.0 + 0.2L + (-0.4 - 140.5L^{-1.27})\Delta G + (-0.04 + 1.1\times10^{-4})\Delta G^2$$

and $$G_1 \geq (-0.40 - 443.8L^{-1.54})\Delta G + (-0.10 - 8.0\times10^6 L^{-4})\Delta G^2 \text{ provided } \Delta G \geq 0.$$

3. An optical transmission method of transmitting signal light by using a multi-core optical fiber having two or more cores as transmission paths, the optical transmission method comprising:

transmitting, by means of two or more transmitters, signal light to adjacent cores, in opposite directions; and injecting, by means of two or more pump light oscillators, pump light into the same cores as transmission cores to which the signal light is transmitted of the adjacent cores such that the pump light propagates in the same directions as or directions reverse to the directions of the signal light, and performing distributed Raman amplification of the signal light by using the pump light, wherein a signal light gain of the signal light transmitted from the transmitters is set such that a ratio of signal intensity to a crosstalk noise intensity leaked from the adjacent transmission cores is maximized high, wherein a signal light gain $G_s$ of the signal light satisfies the following formula with respect to a transmission distance L of the adjacent transmission cores:

$$G_s \leq 12.1 - 18.1\times10^3 L^{-19}.$$

* * * * *